(12) United States Patent
Suzuki

(10) Patent No.: US 12,480,191 B2
(45) Date of Patent: *Nov. 25, 2025

(54) STEEL SHEET

(71) Applicant: NIPPON STEEL CORPORATION, Tokyo (JP)

(72) Inventor: Yuya Suzuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 18/274,364

(22) PCT Filed: Feb. 18, 2022

(86) PCT No.: PCT/JP2022/006739
§ 371 (c)(1),
(2) Date: Jul. 26, 2023

(87) PCT Pub. No.: WO2022/202023
PCT Pub. Date: Sep. 29, 2022

(65) Prior Publication Data
US 2024/0084427 A1    Mar. 14, 2024

(30) Foreign Application Priority Data
Mar. 25, 2021 (JP) .................. 2021-051257

(51) Int. Cl.
*C22C 38/60* (2006.01)
*B32B 15/01* (2006.01)
(Continued)

(52) U.S. Cl.
CPC ............ *C22C 38/60* (2013.01); *B32B 15/013* (2013.01); *C21D 1/18* (2013.01); *C21D 6/001* (2013.01);
(Continued)

(58) Field of Classification Search
None
See application file for complete search history.

(56) References Cited

U.S. PATENT DOCUMENTS

2008/0000555 A1   1/2008   Nonaka et al.
2014/0242416 A1   8/2014   Matsuda et al.
(Continued)

FOREIGN PATENT DOCUMENTS

EP    4 144 471 A1   3/2023
JP    6-128688 A     5/1994
(Continued)

OTHER PUBLICATIONS

U.S. Notice of Allowance for U.S. Appl. No. 18/273,453, dated Mar. 27, 2025.
(Continued)

Primary Examiner — Seth Dumbris
(74) Attorney, Agent, or Firm — Birch, Stewart, Kolasch & Birch, LLP

(57) ABSTRACT

A steel sheet has a predetermined chemical composition, when a sheet thickness is denoted by t, a metallographic structure at a t/4-position, which is a position t/4 away from a surface, in a cross section in a sheet thickness direction includes, by volume percentage, martensite: 70% or greater and residual austenite: 10% or greater, the maximum grain diameter of the residual austenite is less than 5.0 μm when a Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater than the average of the Mn concentrations at all of the plurality of measurement points is less than 10.0%, and the tensile strength is 1,470 MPa or greater.

4 Claims, 1 Drawing Sheet

(51) Int. Cl.

| | | |
|---|---|---|
| *C21D 1/18* | (2006.01) | |
| *C21D 6/00* | (2006.01) | |
| *C21D 8/02* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/10* | (2006.01) | |
| *C22C 38/12* | (2006.01) | |
| *C22C 38/14* | (2006.01) | |
| *C22C 38/16* | (2006.01) | |
| *C22C 38/22* | (2006.01) | |
| *C22C 38/26* | (2006.01) | |
| *C22C 38/28* | (2006.01) | |
| *C22C 38/32* | (2006.01) | |
| *C22C 38/34* | (2006.01) | |
| *C22C 38/38* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *C22C 38/54* | (2006.01) | |
| *C22C 38/58* | (2006.01) | |
| *C23C 2/28* | (2006.01) | |

(52) U.S. Cl.
CPC ............. *C21D 6/002* (2013.01); *C21D 6/004* (2013.01); *C21D 6/005* (2013.01); *C21D 6/007* (2013.01); *C21D 6/008* (2013.01); *C21D 8/0205* (2013.01); *C21D 8/021* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C21D 2211/001* (2013.01); *C21D 2211/008* (2013.01); *C23C 2/28* (2013.01)

(56) References Cited

U.S. PATENT DOCUMENTS

| | | | |
|---|---|---|---|
| 2015/0225821 A1* | 8/2015 | Hikida | ............... C22C 38/58 420/104 |
| 2016/0010192 A1* | 1/2016 | Kitsuya | ............... C21D 6/005 148/541 |
| 2019/0161822 A1 | 5/2019 | Takashima et al. | |
| 2021/0140023 A1 | 5/2021 | Toji et al. | |

FOREIGN PATENT DOCUMENTS

| | | |
|---|---|---|
| JP | 4445365 B2 | 4/2010 |
| JP | 5305149 B2 | 10/2013 |
| WO | WO 2013/051238 A1 | 4/2013 |
| WO | WO 2021/261479 A1 | 12/2021 |

OTHER PUBLICATIONS

U.S. Office Action for U.S. Appl. No. 18/273,453, dated Nov. 7, 2024.

\* cited by examiner

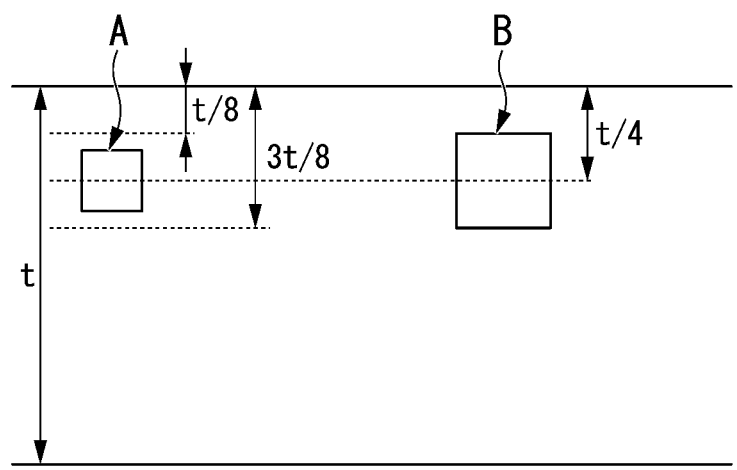

STEEL SHEET

TECHNICAL FIELD OF THE INVENTION

The present invention relates to a steel sheet.

Priority is claimed on Japanese Patent Application No. 2021-051257, filed on Mar. 25, 2021, the content of which is incorporated herein by reference.

RELATED ART

In recent years, improvement of vehicle fuel efficiency has been required from the viewpoint of control of greenhouse gas emissions associated with global warming countermeasures, and the application of high strength steel sheets has been further expanded to reduce the weight of vehicle bodies and secure collision safety.

High strength steel sheets provided for vehicle components are required to have not only strength but also properties necessary for forming a component, such as press formability. The strength and the press formability are generally in a trade-off relationship. However, as a steel sheet excellent in both the strength and the press formability, a transformation induced plasticity (TRIP) steel sheet utilizing the transformation induced plasticity of residual austenite has been known.

For example, Patent Documents 1 and 2 disclose a technology related to a high strength TRIP steel sheet in which the volume fraction of a structure is controlled to be within a predetermined range to improve elongation and hole expansion ratio.

PRIOR ART DOCUMENT

Patent Document

[Patent Document 1] International Publication No. 2013/051238

[Patent Document 2] Japanese Patent No. 4445365

DISCLOSURE OF THE INVENTION

Problems to be Solved by the Invention

Particularly recently, there has been an increasing need for high strength steel sheets having excellent formability and a tensile strength of 1,470 MPa or greater in the application of high strength steel sheets in the field of vehicles. However, TRIP steel having a tensile strength of 1,470 MPa or greater has a problem in that the strength of a welded joint when the steel is welded may be low.

Regarding such a problem, Patent Documents 1 and 2 relate to a high strength TRIP steel sheet, but do not show that a tensile strength of 1,470 MPa or greater can be obtained, and do not consider the joint strength in a TRIP steel sheet having a tensile strength of 1,470 MPa or greater.

As above, there has been no proposal for a technology for improving the strength of a welded joint made from TRIP steel having a tensile strength of 1,470 MPa or greater.

An object of the present invention is to provide a steel sheet which has excellent formability and a tensile strength of 1,470 MPa or greater and can obtain a sufficient welded joint strength.

Means for Solving the Problem

The present inventors have conducted studies on the reason why a sufficient welded joint strength cannot be obtained in a TRIP steel sheet having a tensile strength of 1,470 MPa or greater.

As a result, the present inventors have found that this is because, in a case where coarse residual austenite or fresh martensite is present in a heat affected zone, these act as the origin of cracks and cracks easily occur. The present inventors have conducted further studies, and as a result, found that refinement of residual austenite is effective for suppressing such cracks, and suppression of Mn segregation is effective for that purpose.

The present invention has been contrived in view of the above problems. The gist of the present invention is as follows.

[1] A steel sheet according to an aspect of the present invention containing, as a chemical composition, by mass %: C: 0.20% to 0.45%; Si: 0.50% to 2.50%; Mn: 1.50% to 3.50%; Al: 0.005% to 1.500%; P: 0% to 0.040%; S: 0% to 0.010%; N: 0% to 0.0100%; O: 0% to 0.00600%; Cr: 0% to 0.50%; Ni: 0% to 1.00%; Cu: 0% to 1.00%; Mo: 0% to 0.50%; Ti: 0% to 0.200%; Nb: 0% to 0.200%; V: 0% to 0.500%; B: 0% to 0.0100%; W: 0% to 0.1000%; Ta: 0% to 0.1000%; Sn: 0% to 0.0500%; Co: 0% to 0.5000%; Sb: 0% to 0.0500%; As: 0% to 0.0500%; Mg: 0% to 0.0500%; Ca: 0% to 0.0400%; Y: 0% to 0.0500%; La: 0% to 0.0500%; Ce: 0% to 0.0500%; Zr: 0% to 0.0500%; and a remainder: Fe and impurities, in which when a sheet thickness is denoted by t, a metallographic structure at a t/4-position, which is a position t/4 away from a surface, in a cross section in a sheet thickness direction includes, by volume percentage, martensite: 70% or greater, and residual austenite: 10% or greater, the maximum grain diameter of the residual austenite is less than 5.0 μm, when a Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater than the average of the Mn concentrations at all of the plurality of measurement points is less than 10.0%, and the tensile strength is 1,470 MPa or greater.

[2] In the steel sheet according to [1], the chemical composition may contain, by mass %, one or more selected from the group consisting of: Cr: 0.01% to 0.50%; Ni: 0.01% to 1.00%; Cu: 0.01% to 1.00%; Mo: 0.01% to 0.50%; Ti: 0.001% to 0.200%; Nb: 0.001% to 0.200%; V: 0.001% to 0.500%; B: 0.0001% to 0.0100%; W: 0.0005% to 0.1000%; Ta: 0.0005% to 0.1000%; Sn: 0.0010% to 0.0500%; Co: 0.0010% to 0.5000%; Sb: 0.0010% to 0.0500%; As: 0.0010% to 0.0500%; Mg: 0.0001% to 0.0500%; Ca: 0.0001% to 0.0400%; Y: 0.0001% to 0.0500%; La: 0.0001% to 0.0500%; Ce: 0.0001% to 0.0500%; and Zr: 0.0001% to 0.0500%.

[3] In the steel sheet according to [1] or [2], the steel sheet may have a hot-dip galvanized layer on the surface.

[4] In the steel sheet according to [3], the hot-dip galvanized layer may be a hot-dip galvannealed layer.

Effects of the Invention

According to the above aspect of the present invention, it is possible to provide a steel sheet which has excellent formability and a tensile strength of 1,470 MPa or greater and can obtain a sufficient welded joint strength.

BRIEF DESCRIPTION OF THE DRAWINGS

FIG. 1 is a diagram showing a region for structure observation and a region for measuring Mn concentration in a cross section in a sheet thickness direction.

EMBODIMENTS OF THE INVENTION

A steel sheet according to one embodiment of the present invention (a steel sheet according to the present embodiment) has the following features: (a) the steel sheet has a predetermined chemical composition; (b) when a sheet thickness is denoted by t, a metallographic structure at a t/4-position, which is a position t/4 away from a surface, in a cross section in a sheet thickness direction includes, by volume percentage, martensite: 70% or greater and residual austenite: 10% or greater; (c) the maximum grain diameter of the residual austenite is less than 5.0 μm; (d) when a Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater than the average of the Mn concentrations at all of the plurality of measurement points is less than 10.0%; and (e) the tensile strength is 1,470 MPa or greater.

These will be described below.

<Chemical Composition>

The chemical composition of the steel sheet according to the present embodiment will be described. Unless otherwise specified, the symbol % of each element's content represents mass %.

C: 0.20% to 0.45%

C (carbon) is an essential element for securing the strength of the steel sheet. In a case where the C content is 0.20% or greater, a desired high strength can be obtained. The C content may be 0.21% or greater or 0.22% or greater.

Meanwhile, in order to secure workability and weldability, the C content is set to 0.45% or less. The C content may be 0.42% or less, 0.40% or less, or 0.38% or less.

Si: 0.50% to 2.50%

Si (silicon) is an element useful for industrially manufacturing a TRIP steel sheet. In a case where Si is contained, the formation of iron carbide in austenite having an increased C concentration is suppressed, and stable residual austenite can be obtained even at room temperature. In order to obtain this effect, the Si content is set to 0.50% or greater.

Meanwhile, in order to secure the weldability of the steel sheet, the Si content is set to 2.50% or less. The Si content may be 2.40% or less, 2.20% or less, or 2.00% or less.

Mn: 1.50% to 3.50%

Mn (manganese) is a strong austenite stabilization element, and is an effective element for increasing the strength of the steel sheet. In order to obtain these effects, the Mn content is set to 1.50% or greater. The Mn content may be 1.60% or greater or 1.70% or greater. In addition, in order to secure weldability and low temperature toughness, the Mn content is set to 3.50% or less. The Mn content may be 3.40% or less, 3.20% or less, or 3.00% or less.

Al: 0.005% to 1.500%

Al (aluminum) is an element which is used for deoxidation of steel, and is an effective element for suppressing the formation of iron carbide and leaving residual austenite as in the case of Si. Therefore, the Al content is set to 0.005% or greater.

Meanwhile, in a case where Al is excessively contained, the effect is saturated and the cost increases unnecessarily. Moreover, the transformation temperature of the steel increases and the load during hot rolling increases. Therefore, the Al content is set to 1.500% or less. The Al content is preferably 1.200% or less, 1.000% or less, or 0.800% or less.

P: 0% to 0.040%

P (phosphorus) is a solid solution strengthening element, and is an effective element for increasing the strength of the steel sheet. However, in a case where P is excessively contained, weldability and toughness are deteriorated. Therefore, the P content is set to 0.040% or less. The P content is preferably 0.035% or less, 0.030% or less, or 0.020% or less. The P content may be 0%, but the cost for dephosphorization increases in extremely reducing the P content. Therefore, the P content may be set to 0.001% or greater from the viewpoint of economic efficiency.

S: 0% to 0.010%

S (sulfur) is an element contained as an impurity, and is an element which forms MnS in steel and deteriorates toughness and hole expansibility. Therefore, the S content is set to 0.010% or less as a range in which toughness and hole expansibility do not significantly deteriorate. The S content is preferably 0.005% or less, 0.004% or less, or 0.003% or less. The S content may be 0%, but the cost for desulfurization increases in extremely reducing the S content. Therefore, the S content may be set to 0.0001% or greater or 0.001% or greater from the viewpoint of economic efficiency.

N: 0% to 0.0100%

N (nitrogen) is an element contained as an impurity, and is an element which forms a coarse nitride in steel and deteriorates bendability and hole expansibility in a case where the content thereof is greater than 0.0100%. Therefore, the Ni content is set to 0.0100% or less. The N content is preferably 0.0080% or less, 0.0060% or less, or 0.0050% or less. The N content may be 0%, but the cost for denitrification increases in extremely reducing the N content. Therefore, the N content may be set to 0.0001% or greater from the viewpoint of economic efficiency.

O: 0% to 0.0060%

O (oxygen) is an element contained as an impurity, and is an element which forms a coarse oxide in steel and deteriorates bendability and hole expansibility in a case where the content thereof is greater than 0.0060%. Therefore, the O content is set to 0.0060% or less. The O content is preferably 0.0050% or less or 0.0040% or less. The O content may be 0%, but the O content may be set to 0.0001% or greater from the viewpoint of manufacturing cost.

The steel sheet according to the present embodiment contains, as a basic chemical composition, the above-described elements (basic elements) and the remainder consisting of Fe and impurities. Here, the "impurities" mean components which are mixed due to the raw materials such as ore and scrap and various factors in the manufacturing process in the industrial manufacturing of a steel sheet, and are permitted within a range not adversely affecting the present invention.

However, the steel sheet may contain the following elements (optional elements) instead of a part of Fe, if necessary. Since these elements are not necessarily contained, the lower limit of the content is 0%. In addition, the following elements may be mixed from scrap or the like as a raw material, but may be contained as impurities as long as the content thereof is equal to or less than an upper limit to be described later.

Cr: 0% to 0.50%

Ni: 0% to 1.00%

Cu: 0% to 1.00%

Cr (chromium), Ni (nickel), and Cu (copper) are all elements which contribute to the improvement of strength. Therefore, one or more selected from these elements may be contained as necessary. To obtain the above-described effect, the amount of one or more selected from Cr, Ni, and Cu is preferably 0.01% or greater, and more preferably 0.10% or greater.

Meanwhile, in a case where the Cr content is greater than 0.50%, the Ni content is greater than 1.00%, or the Cu content is greater than 1.00%, there is a concern that the pickling property, the weldability, and the hot workability may be lowered. Therefore, the Cr content is set to 0.50% or less, the Ni content is set to 1.00% or less, and the Cu content is set to 1.00% or less. The Cr content may be 0.40% or less, 0.30% or less, or 0.10% or less. The Ni content may be 0.80% or less, 0.60% or less, or 0.20% or less. The Cu content may be 0.80% or less, 0.60% or less, or 0.20% or less.

Mo: 0% to 0.50%

Mo (molybdenum) is an element which increases the hardenability of steel and contributes to the improvement of strength as in the case of Mn. Therefore, Mo may be contained as necessary. To obtain the above-described effect, the Mo content is preferably 0.01% or greater, and more preferably 0.10% or greater.

Meanwhile, in a case where the Mo content is greater than 0.50%, the hot workability is lowered, and there is a concern that the productivity may be lowered. Therefore, the Mo content is set to 0.50% or less. The Mo content is preferably 0.40% or less, 0.30% or less, or 0.10% or less.

Ti: 0% to 0.200%

Nb: 0% to 0.200%

V: 0% to 0.500%

Ti (titanium), Nb (niobium), and V (vanadium) are all elements which contribute to the improvement of the strength of the steel sheet by precipitation hardening, grain refinement strengthening by suppression of crystal grain growth, and dislocation strengthening through suppression of recrystallization. Therefore, one or more selected from these elements may be contained as necessary. To obtain the above-described effect, the steel sheet preferably contains at least one selected from 0.001% or greater of T, 0.0001% or greater of Nb, and 0.001% or greater of V.

Meanwhile, in a case where the Ti content is greater than 0.200%, the Nb content is greater than 0.200%, or the V content is greater than 0.500%, there is a concern that a coarse carbonitride may be precipitated and the formability may be lowered. Therefore, the Ti content is set to 0.200% or less, the Nb content is set to 0.200% or less, and the V content is set to 0.500% or less. The Ti content may be set to 0.180% or less, 0.150% or less, or 0.100% or less. The Nb content may be set to 0.180% or less, 0.150% or less, or 0.100% or less. The V content may be 0.400% or less, 0.300% or less, or 0.100% or less.

B: 0% to 0.0100%

B (boron) is an element which is segregated on the austenite grain boundary during welding, thereby strengthening the grain boundary, and contributing to the improvement of liquid metal embrittlement crack resistance. Therefore, B may be contained as necessary. To obtain the above-described effect, the B content is preferably 0.0001% or greater, and more preferably 0.0005% or greater or 0.0008% or greater.

Meanwhile, in a case where the B content is greater than 0.0100%, a carbide and a nitride are formed, the above-described effects are saturated, and the hot workability is lowered. Therefore, the B content is set to 0.0100% or less. The B content is preferably 0.0080% or less, 0.0050% or less, or 0.0030% or less.

W: 0% to 0.1000%

Ta: 0% to 0.1000%

Sn: 0% to 0.0500%

Co: 0% to 0.5000%

As: 0% to 0.0500%

W (tungsten), Ta (tantalum), Sn (tin), Co (cobalt), and As (arsenic) are elements which contribute to the improvement of the strength of the steel sheet by precipitation hardening and suppression of crystal grain coarsening. Therefore, these elements may be contained. In a case where the effects are obtained, the W content may be set to 0.0005% or greater, 0.0010% or greater, 0.0050% or greater, or 0.0100% or greater. The Ta content may be set to 0.0005% or greater, 0.0010% or greater, 0.0050% or greater, or 0.0100% or greater. The Sn content may be set to 0.0010% or greater, 0.0020% or greater, or 0.0050% or greater. The Co content may be set to 0.0010% or greater, 0.0100% or greater, or 0.0300% or greater. The As content may be set to 0.0010% or greater, 0.0020% or greater, or 0.0050% or greater.

Meanwhile, in a case where these elements are contained in a large amount, there is a concern that various characteristics of the steel sheet may be impaired. Therefore, the W content is set to 0.1000% or less, the Ta content is set to 0.1000% or less, the Sn content is set to 0.0500% or less, the Co content is set to 0.5000% or less, and the As content is set to 0.0500% or less. The W content may be set to 0.0800% or less, 0.0500% or less, or 0.0300% or less. The Ta content may be set to 0.0800% or less, 0.0500% or less, or 0.0300% or less. The Sn content may be set to 0.0400% or less, 0.0300% or less, or 0.0100% or less. The Co content may be set to 0.4000% or less, 0.3000% or less, or 0.1000% or less. The As content may be set to 0.0400% or less, 0.0300% or less, or 0.0100% or less.

Mg: 0% to 0.0500%

Ca: 0% to 0.0400%

Y: 0% to 0.0500%

La: 0% to 0.0500%

Ce: 0% to 0.0500%

Zr: 0% to 0.0500%

Sb: 0% to 0.0500%

Ca (calcium), Mg (magnesium), Y (yttrium), La (lanthanum). Ce (cerium). Zr (zirconium), and Sb (antimony) are all elements which contribute to the improvement of formability. Therefore, one or more selected from these elements may be contained as necessary. To obtain the above-described effect, the amount of one or more selected from Mg, Ca, Y, La, Ce, Zr, and Sb is preferably 0.0001% or greater or 0.0010% or greater. The Sb content is more preferably 0.0020% or greater or 0.0050% or greater.

Meanwhile, in a case where the amount of Mg, Y, La, Ce, Zr, or Sb is greater than 0.0500% or the Ca content is greater than 0.0400%, there is a concern that the pickling property, the weldability, and the hot workability may be lowered. Therefore, the Mg content, the Y content, the La content, the Ce content, the Zr content, and the Sb content are all set to 0.0500% or less, and the Ca content is set to 0.0400% or less. Each of the Mg content, the Ca content, the Y content, the La content, the Ce content, the Zr content, and the Sb content is preferably 0.0350% or less, 0.0300% or less, or 0.0100% or less.

As described above, the steel sheet according to the present embodiment contains, as a chemical composition, basic elements and the remainder consisting of Fe and impurities, or basic elements, further one or more optional elements, and the remainder consisting of Fe and impurities.

<When Sheet Thickness is Denoted by t, Metallographic Structure at t/4-Position which is Position t/4 Away from Surface in Cross Section in Sheet Thickness Direction>

[Martensite: 70 Vol % or Greater]

In the steel sheet according to the present embodiment, the volume percentage of martensite is set to 70% or greater to secure a tensile strength of 1,470 MPa or greater. In a case where the volume percentage of martensite is less than 70%, a sufficient tensile strength cannot be secured. In a case where the volume percentage of martensite is greater than 90%, a sufficient volume percentage of residual austenite cannot be secured. Therefore, the volume percentage of martensite is 90% or less.

In the steel sheet according to the present embodiment, martensite includes so-called fresh martensite and tempered martensite.

[Residual Austenite: 10 Vol % or Greater]

Residual austenite is a structure which improves the elongation of the steel sheet by a TRIP effect that transformation to martensite occurs by strain-induced transformation during deformation of the steel sheet. Therefore, the volume percentage of residual austenite is set to 10% or greater.

As the volume percentage of residual austenite increases, the elongation of the steel sheet increases. However, in order to obtain a large amount of residual austenite, it is necessary to contain a large amount of alloying elements such as C. Therefore, the volume percentage of residual austenite is set to 30% or less.

[Remainder: One or More Selected from Ferrite, Pearlite, and Bainite]

As the remainder other than martensite and residual austenite, one or more selected from ferrite, pearlite, and bainite may be contained. The volume percentage of the remainder is, for example, 10% or less or 5% or less. The volume percentage of the remainder may be 0%.

The volume percentage of martensite at a t/4-position is obtained by the following procedure.

An observation surface of a sample is etched with a LePera liquid. Within a range of ⅛ to ⅜ of the sheet thickness from the surface, centered at a position ¼ of the sheet thickness away from the surface in a cross section in a sheet thickness direction as shown by A in FIG. 1, a region of 100 μm×100 μm is observed at a magnification of 3,000-fold using FE-SEM. In LePera corrosion, martensite and residual austenite are not corroded. Therefore, the area ratio of the uncorroded region is a total area ratio of martensite and residual austenite. In addition, in the present embodiment, the total area ratio of martensite and residual austenite is regarded as a total volume percentage of martensite and residual austenite. The volume percentage of martensite is calculated by subtracting the volume percentage of residual austenite measured by a method to be described later from the area ratio (that is, volume percentage) of the uncorroded region.

The volume percentage of residual austenite can be calculated by measurement using an X-ray diffractometer. In the measurement using an X-ray diffractometer, first, a region from a sheet surface (rolled surface) of a sample to a surface at a depth of ¼ of the sheet thickness is removed by mechanical polishing and chemical polishing. Next, in the surface at a depth of ¼ of the sheet thickness t, the integrated intensity ratios of the diffraction peaks of (200) and (211) of the bcc phase and (200), (220), and (311) of the fcc phase are obtained using MoKα rays as characteristic X-rays, and based on the integrated intensity ratios, the volume percentage of residual austenite is calculated.

The volume percentages of ferrite, bainite, and pearlite at the t/4-position are obtained by the following procedure. An observation surface of a sample is etched with a LePera liquid. Within a range of ⅛ to ⅜ of the sheet thickness from the surface, centered at a position ¼ of the sheet thickness away from the surface in a cross section in a sheet thickness direction as shown by A in FIG. 1, a region of 100 μm×100 μm is observed at a magnification of 3,000-fold using FE-SEM.

A region containing no cementite in the crystal is determined as ferrite, a region containing cementite in the crystal in which the cementite is arranged in a lamellar shape is determined as pearlite, and a region containing cementite in the crystal and having a plurality of variants of cementite is determined as bainite. Then, the area ratios thereof are obtained by a point-counting method (according to ASTM E562). Assuming that the area ratio and the volume percentage are the same, the obtained area ratio of each structure is defined as the volume ratio.

[Maximum Grain Diameter of Residual Austenite in Metallographic Structure at t/4-Position: Less than 5.0 μm]

In a case where coarse residual austenite or fresh martensite is present in a heat affected zone, cracks easily occur, originating from these structures. For suppressing cracks originating from residual austenite (γ) or fresh martensite in a heat affected zone in order to increase the strength of a welded joint, the maximum grain diameter of residual γ at the t/4-position of the final product (steel sheet) may be less than 5.0 μm.

The lower limit of the maximum grain diameter is not limited. However, since it is not easy to set the maximum grain diameter to be less than 0.1 μm, a substantial lower limit is 0.1 μm.

The maximum grain diameter of residual austenite is obtained by the following method. Crystal orientation analysis (SEM-EBSD) using a scanning electron microscope (SEM) and backscattered electrons is used for observing the structure.

First, an observation surface of a sample is wet-polished with emery paper, and further buffed using diamond abrasive grains having an average diameter of 1 μm for mirror finishing. Subsequently, colloidal silica polishing is performed using a suspension containing an alcohol as a solvent to remove the strain introduced on the polished surface by the above-described mechanical polishing. In the colloidal silica polishing, in a case where the load increases during polishing, strain may be further introduced. Therefore, it is important to suppress the load during polishing. Therefore, in the polishing with colloidal silica, automatic polishing may be performed for one hour with an output set to 40% using a VIBROMET 2 manufactured by BUEHLER.

A range of ⅛ to ⅜ of the sheet thickness from the surface, centered at a t/4-position of the sample adjusted by the above procedure, is observed by SEM-EBSD. For the observation, a magnification in which the number of crystal grains of residual austenite included in the microstructure is 10 or more is selected from among 1,000 to 9,000-fold, and for example, 3,000-fold is selected. Crystal orientation data of F.C.C-iron is measured by SEM-EBSD. The measurement interval (STEP) is set to 0.01 to 0.10 μm, and 0.05 μm may be selected. In the crystal orientation MAP data of F.C.C-iron obtained under the measurement conditions, the boundary where the crystal orientation difference is 15 degrees or greater is defined as a grain boundary, and the maximum grain diameter of residual austenite is obtained.

<When Mn Concentration is Measured at Plurality of Measurement Points at Intervals of 1 μm in Square Region with <Side Length of t/4 Centered at t/4-Position in Cross Section in Sheet Thickness Direction, Proportion of Measurement Points at which Mn Concentration is 1.1 Times or Greater Average of Mn Concentrations at Plurality of Measurement Points (all Measurement Points): Less than 10.0%>

As described above, in a case where coarse residual austenite or fresh martensite is present in a heat affected zone of a welded joint, these act as the origin of cracks and cracks easily occur.

In order to suppress such cracks, it is effective to refine the residual austenite in the steel sheet before welding. Since coarse residual austenite is generated in the Mn segregation portion, it is effective to suppress Mn segregation to refine the residual austenite.

Specifically, when a Mn concentration is measured at a plurality of measurement points at intervals of 1 μm using an electron probe microanalyzer (EPMA) in a square region with a side length of t/4 centered at a t/4-position in a cross section in a sheet thickness direction as shown by B in FIG. 1, a proportion (number proportion) of measurement points at which the Mn concentration is 1.1 times or greater (1.1 or greater when an average is 1.0) an average of the Mn concentrations at the plurality of measurement points (all the measurement points) is required to be less than 10.0%. That is, when "concentration at each measurement point/average concentration at all measurement points in measurement region" is defined as a segregation degree, the proportion of the measurement points at which the segregation degree is 1.1 or greater is required to be less than 10.0%.

<Mechanical Properties>

[Tensile Strength: 1,470 MPa or Greater]

The tensile strength of the steel sheet according to the present embodiment is set to 1,470 MPa or greater in consideration of contribution to the weight reduction of a vehicle body.

In addition, in the steel sheet according to the present embodiment, tensile strength×total elongation (TS×tEl) is preferably 18,000 MPa·% or greater.

The tensile strength (TS) and the total elongation (tEl) are obtained by performing a tensile test according to JIS Z 2241: 2011 with a JIS No. 5 tensile test piece collected from the steel sheet in a direction perpendicular to the rolling direction.

[Plating Layer]

The above-described steel sheet according to the present embodiment may have a hot-dip galvanized layer on the surface thereof. Due to the hot-dip galvanized layer present on the surface, corrosion resistance is improved.

For example, in a case where the steel sheet is used under an environment where it corrodes, perforation or the like may occur, and thus it may not be possible to reduce the thickness to a certain sheet thickness or less even in a case where the strength is increased. One purpose of increasing the strength of the steel sheet is to reduce the weight by making the steel sheet thinner. Accordingly, even in a case where a high strength steel sheet is developed, the site where the steel sheet is to be applied is limited in a case where the steel sheet has low corrosion resistance. Therefore, the steel sheet is considered to be plated with a hot-dip galvanizing coating or the like with high corrosion resistance. The plating layer is, for example, a galvanized layer such as a hot-dip galvanized layer or an electrogalvanized layer. In addition, the galvanized layer may be a plating containing Si, Al and/or Mg in addition to Zn.

In addition, the hot-dip galvanized layer may be a hot-dip galvannealed layer. In the hot-dip galvannealed layer, Fe is incorporated into the hot-dip galvanized layer by the alloying treatment, so that excellent weldability and coatability can be obtained.

In addition, upper layer plating may be performed on the galvanized layer in order to improve the coatability and the weldability. In addition, in the cold-rolled steel sheet according to the present embodiment, various treatments such as a chromate treatment, a phosphate treatment, a lubricity improvement treatment, and a weldability improvement treatment may be performed on the hot-dip galvanized layer.

[Joint Strength]

In consideration of weldability in assembling of a vehicle body, the steel sheet according to the present embodiment preferably has a joint strength of greater than 6.0 kN when being formed into a joint.

Regarding the joint strength, a test piece according to JIS Z 3137 (1999) is collected from the steel sheet in a direction perpendicular to the rolling direction, and welding is performed using a servo motor pressurized single-phase AC spot welding machine (power supply frequency: 50 Hz). Then, a cross tensile test is performed according to JIS Z 3137 (1999).

<Manufacturing Method>

The steel sheet according to the present embodiment can be manufactured by a manufacturing method including the following steps.

(I) A first Mn segregation reduction step in which a slab obtained by continuous casting or the like is held at 1,300° C. or higher for 5.0 hours or longer and cooled to 200° C. or lower at an average cooling rate of 20° C./hr or higher and 80° C./hr or lower;

(II) A second Mn segregation reduction step in which the slab is heated and held at 1,200° C. or higher for 1.0 hour or longer;

(III) A hot rolling step of hot-rolling the slab after the second Mn segregation reduction step to obtain a hot-rolled steel sheet;

(IV) A coiling step of coiling the hot-rolled steel sheet;

(V) A cold rolling step of cold-rolling the hot-rolled steel sheet after the coiling step to obtain a cold-rolled steel sheet; and (VI) An annealing step of annealing the cold-rolled steel sheet Hereinafter, each step will be described.

[First Mn Segregation Reduction Step]

In the first Mn segregation reduction step, a slab obtained by continuous casting or the like is held at 1,300° C. or higher for 5.0 hours or longer before the hot rolling step and cooled to 200° C. or lower at an average cooling rate of 20° C./hr or higher and 80° C./hr or lower.

By holding the slab at a high temperature of 1,300° C. or higher for 5.0 hours or longer, the diffusion rate of Mn is increased, and the segregation of Mn is reduced. However, the segregation of Mn is not sufficiently reduced only by the holding. Furthermore, it is necessary to perform cooling to 200° C. or lower at an average cooling rate of 20° C./hr or higher. By cooling to 200° C. or lower at an average cooling rate of 20° C./hr or higher, dislocation due to a difference in thermal contraction is introduced. Since the dislocation becomes a high-speed diffusion path of Mn during heating in the next second Mn segregation reduction step, Mn can be efficiently diffused, and the Mn segregation degree is reduced.

The dislocation is introduced more as the average cooling rate is high. However, in a case where the cooling rate is too high, the difference in thermal contraction is excessive and the risk of slab cracking increases. Therefore, the average cooling rate is set to 80° C./hr or lower.

In a case where the heating temperature is excessively increased, the manufacturing cost is increased, and in a case where the heating time is increased, the productivity deteriorates. From these viewpoints, the heating temperature of the slab may be set to 1,400° C. or lower, and the holding time at 1,300° C. or higher may be set to 50.0 hours or shorter.

[Second Mn Segregation Reduction Step]

In the second Mn segregation reduction step, the slab after the first Mn segregation reduction step is heated to 1,200° C. or higher in a heating furnace and held for 1.0 hour or longer in that temperature range.

By performing the first Mn segregation reduction step and then holding the slab at 1,200° C. or higher for 1.0 hour or longer, the dislocation introduced into the slab can be used as a high-speed diffusion path, and Mn can be diffused. Therefore, the Mn segregation is further reduced.

In a case where the heating temperature is excessively increased, the manufacturing cost is increased, and in a case where the heating time is increased, the productivity deteriorates. From these viewpoints, the heating temperature of the slab may be set to 1,300° C. or lower, and the holding time at 1,200° C. or higher may be set to 5.0 hours or shorter.

The second Ma segregation reduction step may be performed in a hot rolling heating furnace as heating for hot rolling.

[Hot Rolling Step]

In the hot rolling step, the slab heated to 1,200° C. or higher in the heating furnace in the second Mn segregation reduction step and held for 1.0 hour or longer in that temperature range is hot-rolled to obtain a hot-rolled steel sheet.

The hot rolling conditions are not particularly limited. For example, finish rolling may be completed at 800° C. or higher and 980° C. or lower, and then the hot-rolled steel sheet may be cooled to a temperature of 600° C. or higher and 750° C. or lower at an average cooling rate of 2.5° C./sec or higher and cooled to a coiling temperature of 600° C. or lower.

[Coiling Step]
[Cold Rolling Step]

The hot-rolled steel sheet after the hot rolling step is coiled into a hot-rolled coil under known conditions, and then cold-rolled under known conditions to obtain a cold-rolled steel sheet. For example, the total rolling reduction may be 20% or greater and 85% or less.

[Annealing Step]

In the annealing step, the cold-rolled steel sheet is heated to a soaking temperature of Ac3° C. or higher and lower than 900° C. so as to have a structure including 70 vol % or greater of martensite and 10 vol % or greater of residual austenite after the annealing step, and is held at the soaking temperature for 5 seconds or longer. Then, the steel sheet is cooled to a temperature range of (Ms point—100)° C. or higher and a Bs point or lower at an average cooling rate of 10° C./sec or higher and 50° C./sec or lower, and is further held within a temperature range of (Ms point—100)° C. or higher and the Bs point or lower for 10 seconds or longer and 600 seconds or shorter.

In order to sufficiently progress austenitizing, the steel sheet is heated to at least the Ac3 point (° C.) or higher and soaked at the temperature (highest heating temperature). However, in a case where the heating temperature is excessively increased, the toughness deteriorates due to the coarsening of the austenite grain diameter, and the annealing facility is damaged. Therefore, the highest heating temperature is set to 950° C. or lower, and preferably 900° C. or lower.

In a case where the soaking time is short, austenitizing does not sufficiently progress. Therefore, the soaking time is set to 5 seconds or longer. The soaking time is preferably 30 seconds or longer or 60 seconds or longer. Meanwhile, in a case where the soaking time is too long, the productivity is impaired. Therefore, the soaking time is preferably set to 600 seconds or shorter, and more preferably 500 seconds or shorter. It is not necessary to hold the steel sheet at a constant temperature during soaking, and the temperature may fluctuate within a range in which the above conditions are satisfied.

The Ac3 point is obtained by the following method.

$$Ac3(° C.)=910-203\times\sqrt{[C]}+44.7\times[Si]-30\times[Mn]+700\times[P]-20\times[Cu]-15.2\times[Ni]-11\times[Cr]+31.5\times[Mo]+400\times[Ti]+104\times[V]+120\times[Al]$$

Here, [C], [Si], [Mn], [P], [Cu], [Ni], [Cr], [Mo], [Ti], [V], and [Al] represent contents (mass %) of the elements contained in the slab, respectively.

Next, the steel sheet is cooled to a temperature range of (Ms point—100)° C. or higher and the Bs point (° C.) or lower at an average cooling rate of 10 to 50° C./sec, and the temperature of the steel sheet is held within the above temperature range. The holding time of the steel sheet within a temperature range of (Ms point—100)° C. or higher and the Bs point or lower is 10 to 600 seconds.

The Ms point is a temperature at which martensite begins to be formed during cooling after quenching. In the manufacturing method according to the present embodiment, a value calculated by the following expression is regarded as the Ms point (° C.).

$$Ms(° C.)=541-474\times[C]/(1-Sa/100)-15\times[Si]-35\times[Mn]-17\times[Cr]-17\times[Ni]+19\times[Al]$$

The Bs point is a temperature (° C.) at which bainitic transformation starts during cooling after quenching. In the manufacturing method according to the present embodiment, a value calculated by the following expression is regarded as the Bs point.

$$Bs(° C.)=820-290\times[C]/(1-Sa/100)-37\times[Si]-90\times[Mn]-65\times[Cr]-50\times[Ni]+70\times[Al]$$

Here, the [element symbol] included in the Ms calculation expression and the Bs calculation expression represents the content (mass %) of each element contained in the steel sheet. The symbol Sa included in the expression is a ferrite fraction (vol %) of the steel sheet at a time when the heating for quenching is completed.

It is difficult to obtain the area ratio of ferrite in a steel sheet during manufacturing. Therefore, a steel sheet which has undergone a temperature history similar to that of the actual steel sheet manufacturing process is prepared in advance, and the area ratio of ferrite in a center portion of the steel sheet is obtained and used for calculation of Ms and Bs. The ferrite fraction of the steel sheet largely depends on the heating temperature for quenching. Therefore, in a case where the cooling conditions are investigated, first, the manufacturing conditions for the steps before cooling are determined, and a steel sheet is manufactured under the above manufacturing conditions. By measuring a ferrite fraction of the steel sheet, Sa can be specified. In addition, in a case where the cooling rate of quenching is high (the cooling rate at which ferritic transformation does not occur), the ferrite fraction after quenching can be regarded as a ferrite fraction at a time when the heating for quenching is completed.

The average cooling rate is a value obtained by dividing the difference between the surface temperature of the steel sheet at a time when the cooling is started and the surface temperature of the steel sheet at a time when the cooling is completed (that is, cooling stop temperature) by the cooling time. For example, in a case where annealing and holding to be described later are performed using a furnace, the time when the cooling is started is a time when the steel sheet is taken out of the furnace for annealing, and the time when the cooling is completed is a time when the steel sheet is charged into the furnace for holding.

The holding time within a temperature range of (Ms point—100)° C. or higher and the Bs point (° C.) or lower means a time during which the surface temperature of the steel sheet is within the above temperature range. Within the above temperature range, the temperature of the steel sheet may fluctuate.

In a case where the average cooling rate of the steel sheet up to a temperature of (Ms point—100)° C. or higher and the Bs point (° C.) or lower is set to 10 to 50° C./sec, a sufficient amount of martensite and/or bainite can be generated in the steel sheet. In a case where the cooling stop temperature of the steel sheet is set to be within a temperature range of (Ms point—100)° C. or higher and the Bs point (° C.) or lower, a sufficient amount of residual austenite can be generated on the occasion of the subsequent holding. In addition, in a case where the holding time of the steel sheet within a temperature range of (Ms point—100)° C. or higher and the Bs point (° C.) or lower is set to 10 to 600 seconds, a sufficient amount of residual austenite is generated, and a reduction in tensile strength of the steel sheet can be prevented.

[Hot-Dip Galvanizing Step]
[Alloying Step]

The cold-rolled steel sheet after annealing may be dipped in a hot-dip galvanizing bath to obtain a hot-dip galvanized steel sheet having a hot-dip galvanized layer on a surface thereof. In addition, the hot-dip galvanized steel sheet may be alloyed to obtain a galvannealed steel sheet. In this case, the temperature of the steel sheet can be kept as described above by using the heat applied to the steel sheet during hot-dip galvanizing and alloying. In any case, known conditions can be applied.

Examples

Slabs (Steel Nos. A to Z) having a chemical composition shown in Tables 1-1 and 1-2 (unit: mass %, remainder: Fe and impurities) were produced by continuous casting.

These slabs were heated, held, and cooled to 200° C. or lower as shown in Tables 2-1 and 2-2.

After that, the slab was further heated and held again as shown in Tables 2-1 and 2-2, and then hot-rolled so that finish rolling was completed at 800° C. to 980° C. Then, the slab was cooled to a coiling temperature of 600° C. or lower so that the average cooling rate up to a temperature of 600° C. or higher and 750° C. or lower was 2.5° C./sec or higher, and the slab was coiled at 600° C. or lower. Thus, a hot-rolled steel sheet of 2.0 to 4.0 mm was obtained.

In addition, these hot-rolled steel sheets were cold-rolled at a rolling reduction of 20% to 85% to obtain cold-rolled steel sheets of 0.8 to 2.0 mm.

These cold-rolled steel sheets were annealed under conditions shown in Tables 3-1 and 3-2 (in a case where the slab was cracked, the steps after the hot rolling were not performed).

In addition, as shown in Tables 3-1 and 3-2, some cold-rolled steel sheets were hot-dip galvanized, and some cold-rolled steel sheets after hot-dip galvanizing were alloyed.

A sample was collected from the obtained cold-rolled steel sheet (including the plated steel sheet) in the above-described manner, and the microstructure was observed to obtain the volume percentages of martensite, residual austenite, and others, and the maximum grain diameter of residual austenite.

In addition, the Mn concentration was measured using EPMA in the above-described manner, and a proportion of measurement points at which concentration at measurement point/average concentration at all measurement points in measurement region (segregation degree) was 1.1 or greater was obtained.

The results are shown in Tables 4-1 and 4-2.

In addition, from the cold-rolled steel sheet after annealing, a JIS No. 5 tensile test piece was collected in a direction perpendicular to the rolling direction, and a tensile test was performed according to JIS Z 2241: 2011 to obtain a tensile strength and a total elongation.

In a case where a tensile strength (TS) was 1,470 MPa or greater and tensile strength×total elongation (TS×tEl) was 18,000 MPa-% or greater, the steel sheet was judged to have a high strength and excellent formability.

The results are shown in Tables 5-1 and 5-2.

In addition, a test piece according to JIS Z 3137: 1999 was collected from the obtained cold-rolled steel sheet in a direction perpendicular to the rolling direction, and welding was performed using a servo motor pressurized single-phase AC spot welding machine (power supply frequency: 50 Hz) with an electrode diameter set to 6 mm, a welding pressure during welding set to 4 kN, a welding current set to 6.0 kA to 9.0 kA, an energization time set to 0.4 seconds, and a holding time set to 0.1 seconds so that the nugget diameter was 5√t (t: sheet thickness). Then, by performing a cross tensile test according to JIS Z 3137: 1999, a joint strength was obtained.

In a case where the joint strength was greater than 6.0 kN, the welded joint was judged to have an excellent welded joint strength.

The results are shown in Tables 5-1 and 5-2.

TABLE 1-1

| No. | C | Si | Mn | Al | P | S | N | O | Cr | Ni | Cu | Mo | Ti | Nb | V | B |
|---|---|---|---|---|---|---|---|---|---|---|---|---|---|---|---|---|
| A | 0.32 | 1.95 | 1.57 | 0.142 | 0.033 | 0.001 | 0.0082 | 0.0006 | | | | | | | | |
| B | 0.24 | 0.57 | 2.33 | 1.007 | 0.004 | 0.009 | 0.0012 | 0.0007 | | | | | | | | |
| C | 0.26 | 0.98 | 2.97 | 0.980 | 0.003 | 0.001 | 0.0009 | 0.0015 | | | | | | | | |
| D | 0.34 | 1.78 | 3.38 | 0.174 | 0.004 | 0.000 | 0.0007 | 0.0050 | | | | | | | | |
| E | 0.21 | 1.55 | 2.75 | 0.460 | 0.004 | 0.001 | 0.0009 | 0.0004 | | | | | | | | |
| F | 0.44 | 1.23 | 2.59 | 0.201 | 0.010 | 0.006 | 0.0012 | 0.0005 | | | | | | | | |
| G | 0.41 | 2.41 | 2.46 | 0.544 | 0.026 | 0.001 | 0.0023 | 0.0040 | | | | | | | | |
| H | 0.37 | 1.42 | 3.26 | 0.278 | 0.006 | 0.002 | 0.0009 | 0.0005 | | | | | | | | |
| I | 0.39 | 0.82 | 2.20 | 0.153 | 0.002 | 0.001 | 0.0009 | 0.0003 | 0.04 | | | 0.03 | | | | |
| J | 0.29 | 2.22 | 1.81 | 0.331 | 0.003 | 0.002 | 0.0068 | 0.0002 | | | | | | 0.014 | | 0.0011 |

TABLE 1-1-continued

| No. | C | Si | Mn | Al | P | S | N | O | Cr | Ni | Cu | Mo | Ti | Nb | V | B |
|---|---|---|---|---|---|---|---|---|---|---|---|---|---|---|---|---|
| K | 0.20 | 1.96 | 3.24 | 0.241 | 0.005 | 0.001 | 0.0066 | 0.0006 | | | 0.10 | | 0.054 | 0.012 | | 0.0011 |
| I | 0.31 | 1.75 | 3.40 | 0.181 | 0.034 | 0.001 | 0.0005 | 0.0016 | | | | | 0.018 | 0.014 | 0.049 | |
| M | 0.23 | 2.44 | 2.62 | 0.176 | 0.009 | 0.008 | 0.0005 | 0.0005 | | 0.06 | 0.09 | 0.05 | | 0.022 | | |
| N | 0.36 | 1.60 | 1.53 | 0.219 | 0.002 | 0.007 | 0.0006 | 0.0009 | 0.05 | | | 0.04 | 0.016 | | | 0.0027 |
| O | 0.39 | 0.62 | 2.75 | 0.917 | 0.003 | 0.003 | 0.0007 | 0.0002 | 0.03 | | | 0.33 | | | | |
| P | 0.28 | 1.98 | 2.19 | 0.383 | 0.027 | 0.001 | 0.0026 | 0.0049 | | | | | 0.010 | | | 0.0009 |
| Q | 0.34 | 0.94 | 2.42 | 0.204 | 0.004 | 0.001 | 0.0011 | 0.0039 | | | 0.16 | | 0.025 | 0.050 | | 0.0008 |
| R | 0.42 | 1.25 | 1.96 | 0.160 | 0.004 | 0.001 | 0.0011 | 0.0004 | | | | | 0.135 | 0.025 | 0.054 | |
| S | 0.44 | 1.42 | 2.97 | 0.142 | 0.003 | 0.001 | 0.0085 | 0.0002 | | 0.67 | 0.07 | 0.02 | | 0.136 | | |
| T | 0.26 | 0.80 | 2.14 | 0.723 | 0.004 | 0.001 | 0.0014 | 0.0006 | 0.06 | | | 0.13 | 0.015 | | | 0.0007 |
| U | 0.19 | 2.42 | 3.27 | 0.102 | 0.003 | 0.001 | 0.0017 | 0.0013 | 0.09 | 0.12 | | | 0.016 | 0.023 | 0.081 | 0.0011 |
| V | 0.46 | 0.62 | 1.99 | 0.214 | 0.029 | 0.001 | 0.0078 | 0.0003 | | | | | | | | |
| W | 0.31 | 0.43 | 2.89 | 0.116 | 0.032 | 0.003 | 0.0085 | 0.0017 | | | | | | | | |
| X | 0.27 | 2.55 | 3.09 | 0.259 | 0.003 | 0.001 | 0.0006 | 0.0044 | | | 0.08 | 0.09 | | | 0.322 | |
| Y | 0.44 | 1.26 | 1.43 | 0.133 | 0.005 | 0.008 | 0.0006 | 0.0004 | 0.06 | 0.45 | 0.16 | | 0.149 | 0.091 | | |
| Z | 0.36 | 0.84 | 3.56 | 0.674 | 0.006 | 0.003 | 0.0009 | 0.0004 | | | 0.14 | | 0.142 | 0.155 | 0.052 | |

TABLE 1-2

| No. | W | Ta | Sn | Co | Sb | As | Mg | Ca | Y | La | Ce | Zr | Ac3 (° C.) |
|---|---|---|---|---|---|---|---|---|---|---|---|---|---|
| A | | | | | | | | | | | | | 875 |
| B | | | | | | | | | | | | | 890 |
| C | | | | | | | | | | | | | 881 |
| D | | | | | | | | | | | | | 793 |
| E | | | | | | | | | | | | | 862 |
| F | | | | | | | | | | | | | 784 |
| G | | | | | | | | | | | | | 897 |
| H | | | | | | | | | | | | | 790 |
| I | | | | | | | | | | | | | 774 |
| J | | | | | | | | | | | | | 893 |
| K | | | | | | | | | | | | | 862 |
| L | | | | | | | | | | | | | 831 |
| M | | | | | | | | | | | | | 869 |
| N | | | | | | | | | | | | | 849 |
| O | 0.0016 | 0.0013 | 0.0331 | | | | | | 0.0050 | | 0.0044 | | 851 |
| P | 0.0006 | 0.0010 | | | | 0.0039 | | 0.0030 | 0.0030 | 0.0136 | | | 894 |
| Q | | | | 0.0036 | 0.0327 | | | | 0.0015 | 0.0030 | | 0.0045 | 795 |
| R | 0.0027 | | 0.0067 | 0.0030 | | | 0.0142 | 0.0430 | 0.0042 | 0.0021 | | | 857 |
| S | | 0.0007 | | | | 0.0024 | 0.0081 | 0.0071 | | 0.0063 | 0.0316 | 0.0337 | 758 |
| T | 0.0006 | 0.0009 | | | | 0.0067 | 0.0028 | 0.0036 | | 0.0041 | | | 877 |
| U | | 0.0008 | | | | 0.0233 | 0.0023 | | | | 0.0054 | 0.0060 | 858 |
| V | | | | | | | | | | | | | 786 |
| W | | | | | | | | | | | | | 766 |
| X | | | | | 0.0380 | 0.0178 | | | 0.0045 | | | | 894 |
| Y | 0.0006 | 0.0075 | 0.0227 | 0.0032 | 0.0022 | 0.0116 | 0.0028 | | 0.0054 | 0.0125 | 0.0041 | | 857 |
| Z | | | | | | | | | | | | | 863 |

TABLE 2-1

| | | First Mn Segregation Reduction Step | | | Second Mn Segregation Reduction Step | |
|---|---|---|---|---|---|---|
| No. | Steel No. | Heating Temperature (° C.) | Holding Time (hr) | Average Cooling Rate up to 200° C. or Lower (° C./hr) | Heating Temperature (° C.) | Holding Time (hr) |
| 1 | A | 1308 | 9.2 | 25 | 1210 | 1.9 |
| 2 | B | 1308 | 12.0 | 72 | 1205 | 3.8 |
| 3 | C | 1307 | 25.1 | 24 | 1210 | 1.4 |
| 4 | D | 1308 | 40.8 | 47 | 1207 | 1.2 |
| 5 | E | 1307 | 7.8 | 60 | 1215 | 4.3 |
| 6 | F | 1308 | 17.0 | 25 | 1208 | 1.3 |
| 7 | G | 1311 | 10.5 | 23 | 1205 | 1.3 |
| 8 | H | 1349 | 12.6 | 29 | 1227 | 1.4 |
| 9 | I | 1307 | 9.4 | 25 | 1217 | 1.2 |
| 10 | J | 1305 | 7.6 | 36 | 1209 | 1.4 |
| 11 | K | 1377 | 9.8 | 26 | 1212 | 1.5 |
| 12 | L | 1384 | 7.8 | 25 | 1210 | 1.3 |
| 13 | M | 1315 | 10.5 | 25 | 1280 | 1.3 |
| 14 | N | 1330 | 8.5 | 29 | 1206 | 2.0 |
| 15 | O | 1365 | 35.0 | 25 | 1284 | 1.3 |
| 16 | P | 1322 | 7.8 | 66 | 1269 | 4.0 |

TABLE 2-1-continued

| No. | Steel No. | First Mn Segregation Reduction Step | | | Second Mn Segregation Reduction Step | |
|---|---|---|---|---|---|---|
| | | Heating Temperature (° C.) | Holding Time (hr) | Average Cooling Rate up to 200° C. or Lower (° C./hr) | Heating Temperature (° C.) | Holding Time (hr) |
| 17 | Q | 1310 | 7.5 | 31 | 1207 | 1.2 |
| 18 | R | 1306 | 7.4 | 24 | 1209 | 2.9 |
| 19 | S | 1313 | 42.3 | 25 | 1245 | 1.6 |
| 20 | T | 1309 | 6.6 | 24 | 1204 | 1.1 |
| 21 | A | 1310 | 26.5 | 23 | 1279 | 1.4 |
| 22 | B | 1379 | 9.4 | 24 | 1211 | 2.9 |
| 23 | C | 1311 | 8.5 | 27 | 1222 | 1.4 |
| 24 | D | 1315 | 11.7 | 59 | 1206 | 1.6 |
| 25 | E | 1331 | 18.0 | 47 | 1226 | 1.4 |
| 26 | F | 1305 | 7.9 | 29 | 1204 | 4.1 |
| 27 | G | 1306 | 7.7 | 26 | 1209 | 1.2 |
| 28 | H | 1309 | 9.6 | 26 | 1208 | 1.2 |
| 29 | I | 1306 | 8.1 | 31 | 1208 | 4.3 |
| 30 | J | 1310 | 14.3 | 25 | 1214 | 1.3 |
| 31 | K | 1317 | 7.7 | 26 | 1208 | 2.1 |
| 32 | L | 1318 | 35.0 | 23 | 1207 | 1.3 |
| 33 | M | 1309 | 41.6 | 23 | 1208 | 1.8 |
| 34 | N | 1345 | 9.2 | 27 | 1283 | 1.4 |
| 35 | O | 1307 | 9.0 | 25 | 1268 | 1.3 |

TABLE 2-2

| No. | Steel No | First Mn Segregation Reduction Step | | | Second Mn Segregation Reduction Step | |
|---|---|---|---|---|---|---|
| | | Heating Temperature (° C.) | Holding Time (hr) | Average Cooling Rate up to 200° C. or Lower (° C./hr) | Heating Temperature (° C.) | Holding Time (hr) |
| 36 | P | 1308 | 6.9 | 24 | 1214 | 3.7 |
| 37 | Q | 1305 | 7.0 | 67 | 1246 | 1.4 |
| 38 | R | 1381 | 11.8 | 36 | 1208 | 1.4 |
| 39 | S | 1369 | 8.1 | 69 | 1209 | 1.2 |
| 40 | T | 1309 | 40.4 | 24 | 1213 | 1.3 |
| 41 | A | 1308 | 27.1 | 28 | 1217 | 3.7 |
| 42 | B | 1309 | 10.3 | 25 | 1205 | 1.5 |
| 43 | C | 1385 | 8.5 | 61 | 1220 | 4.3 |
| 44 | D | 1309 | 43.2 | 29 | 1210 | 1.3 |
| 45 | E | 1307 | 40.6 | 24 | 1245 | 1.4 |
| 46 | F | 1306 | 8.4 | 25 | 1206 | 1.3 |
| 47 | G | 1309 | 9.0 | 49 | 1231 | 4.1 |
| 48 | H | 1310 | 13.9 | 37 | 1214 | 2.2 |
| 49 | I | 1305 | 8.4 | 27 | 1205 | 1.4 |
| 50 | J | 1309 | 36.5 | 26 | 1278 | 1.3 |
| 51 | K | 1311 | 10.0 | 69 | 1205 | 2.8 |
| 52 | L | 1317 | 8.3 | 23 | 1282 | 1.2 |
| 53 | M | 1312 | 17.9 | 66 | 1265 | 1.2 |
| 54 | N | 1309 | 9.4 | 23 | 1210 | 1.3 |
| 55 | U | 1310 | 11.9 | 26 | 1210 | 1.4 |
| 56 | V | 1344 | 7.2 | 30 | 1206 | 1.7 |
| 57 | W | 1380 | 9.3 | 24 | 1207 | 1.8 |
| 58 | X | 1367 | 6.9 | 25 | 1209 | 1.6 |
| 59 | Y | 1322 | 8.0 | 24 | 1211 | 1.3 |
| 60 | Z | 1328 | 7.7 | 26 | 1208 | 1.3 |
| 61 | O | 1277 | 9.9 | 25 | 1205 | 1.1 |
| 62 | Q | 1309 | 3.4 | 26 | 1224 | 1.3 |
| 63 | S | 1310 | 34.5 | 16 | 1208 | 1.2 |
| 64 | T | 1375 | 7.3 | 87 | — | — |
| 65 | A | 1314 | 8.7 | 27 | 1188 | 1.3 |
| 66 | C | 1314 | 14.6 | 25 | 1237 | 0.8 |
| 67 | B | 1362 | 9.3 | 45 | 1205 | 1.4 |
| 68 | G | 1312 | 7.1 | 23 | 1214 | 4.1 |
| 69 | I | 1307 | 21.7 | 23 | 1207 | 1.4 |
| 70 | J | 1341 | 41.8 | 30 | 1216 | 1.4 |

TABLE 3-1

| | | | Annealing Step | | | Remarks | |
|---|---|---|---|---|---|---|---|
| | | | Average Cooling Rate in Cooling to Temperature of | Holding Time at Temperature of | | | |
| No. | Heating Temperature (° C.) | Holding Time (sec) | (Ms Point - 100)° C. or Higher and Bs Point or Lower (° C./sec) | (Ms Point - 100)° C. or Higher and Bs Point or Lower (sec) | Plating | Ms Point (° C.) | Bs Point (° C.) |
| 1 | 898 | 259 | 47 | 473 | Hot-Dip Galvanizing | 308 | 524 |
| 2 | 899 | 186 | 20 | 270 | | 355 | 589 |
| 3 | 896 | 133 | 33 | 30 | Hot-Dip Galvannealing | 315 | 508 |
| 4 | 893 | 339 | 32 | 103 | | 238 | 364 |
| 5 | 899 | 377 | 17 | 374 | | 331 | 486 |
| 6 | 892 | 14 | 25 | 147 | | 223 | 425 |
| 7 | 899 | 501 | 30 | 421 | | 235 | 429 |
| 8 | 884 | 449 | 24 | 108 | | 230 | 383 |
| 9 | 874 | 391 | 49 | 532 | | 267 | 486 |
| 10 | 899 | 301 | 31 | 59 | Hot-Dip Galvannealing | 310 | 512 |
| 11 | 898 | 122 | 28 | 333 | | 307 | 414 |
| 12 | 868 | 431 | 15 | 235 | | 249 | 370 |
| 13 | 892 | 510 | 42 | 207 | | 305 | 436 |
| 14 | 852 | 205 | 26 | 590 | Hot-Dip Galvanizing | 294 | 530 |
| 15 | 896 | 302 | 14 | 414 | | 266 | 498 |
| 16 | 897 | 574 | 42 | 308 | | 309 | 495 |
| 17 | 835 | 41 | 45 | 349 | Hot-Dip Galvannealing | 283 | 482 |
| 18 | 889 | 560 | 37 | 191 | Hot-Dip Galvannealing | 258 | 487 |
| 19 | 854 | 245 | 41 | 502 | Hot-Dip Galvannealing | 196 | 348 |
| 20 | 897 | 75 | 26 | 553 | | 344 | 569 |
| 21 | 890 | 462 | 39 | 388 | Hot-Dip Galvannealing | 306 | 523 |
| 22 | 891 | 28 | 24 | 194 | | 355 | 589 |
| 23 | 897 | 529 | 49 | 148 | Hot-Dip Galvannealing | 316 | 509 |
| 24 | 856 | 49 | 46 | 119 | | 237 | 363 |
| 25 | 888 | 306 | 44 | 335 | | 330 | 486 |
| 26 | 841 | 379 | 32 | 172 | | 227 | 428 |
| 27 | 899 | 400 | 28 | 84 | | 231 | 426 |
| 28 | 869 | 479 | 47 | 399 | Hot-Dip Galvannealing | 236 | 386 |
| 29 | 803 | 564 | 40 | 246 | | 267 | 486 |
| 30 | 896 | 91 | 43 | 550 | | 312 | 513 |
| 31 | 898 | 216 | 10 | 437 | | 307 | 414 |
| 32 | 864 | 121 | 27 | 576 | | 252 | 372 |
| 33 | 899 | 186 | 19 | 349 | | 306 | 437 |
| 34 | 866 | 566 | 35 | 535 | | 293 | 529 |
| 35 | 892 | 415 | 43 | 41 | | 264 | 496 |

TABLE 3-2

| | | | Annealing Step | | | Remarks | |
|---|---|---|---|---|---|---|---|
| | | | Average Cooling Rate in Cooling to Temperature of | Holding Time at Temperature of | | | |
| No. | Heating Temperature (° C.) | Holding Time (sec) | (Ms Point - 100)° C. or Higher and Bs Point or Lower (° C./sec) | (Ms Point - 100)° C. or Higher and Bs Point or Lower (sec) | Plating | Ms Point (° C.) | Bs Point (° C.) |
| 36 | 897 | 137 | 17 | 302 | | 309 | 495 |
| 37 | 897 | 155 | 35 | 72 | Hot-Dip Galvannealing | 283 | 482 |
| 38 | 898 | 344 | 23 | 490 | | 258 | 487 |
| 39 | 842 | 255 | 14 | 452 | Hot-Dip Galvannealing | 198 | 349 |
| 40 | 895 | 303 | 12 | 228 | | 344 | 569 |
| 41 | 876 | 521 | 41 | 262 | Hot-Dip Galvannealing | 306 | 523 |
| 42 | 898 | 105 | 27 | 48 | | 356 | 590 |
| 43 | 898 | 230 | 38 | 235 | | 318 | 510 |

TABLE 3-2-continued

| | Annealing Step | | | | | Remarks | |
|---|---|---|---|---|---|---|---|
| | | | Average Cooling Rate in Cooling to Temperature of | Holding Time at Temperature of | | | |
| No. | Heating Temperature (° C.) | Holding Time (sec) | (Ms Point - 100)° C. or Higher and Bs Point or Lower (° C./sec) | (Ms Point - 100)° C. or Higher and Bs Point or Lower (sec) | Plating | Ms Point (° C.) | Bs Point (° C.) |
| 44 | 897 | 549 | 16 | 536 | | 238 | 364 |
| 45 | 896 | 498 | 30 | 79 | | 329 | 485 |
| 46 | 846 | 187 | 22 | 136 | | 227 | 428 |
| 47 | 899 | 27 | 34 | 512 | Hot-Dip Galvanizing | 235 | 429 |
| 48 | 829 | 151 | 19 | 445 | Hot-Dip Galvannealing | 236 | 386 |
| 49 | 870 | 58 | 44 | 277 | | 263 | 483 |
| 50 | 899 | 203 | 11 | 565 | | 313 | 514 |
| 51 | 876 | 301 | 17 | 78 | | 306 | 414 |
| 52 | 896 | 372 | 34 | 403 | Hot-Dip Galvanizing | 249 | 370 |
| 53 | 898 | 265 | 16 | 185 | Hot-Dip Galvannealing | 304 | 435 |
| 54 | 899 | 292 | 40 | 161 | | 296 | 531 |
| 55 | 872 | 468 | 22 | 339 | | 299 | 376 |
| 56 | 899 | 72 | 21 | 499 | | 248 | 500 |
| 57 | 862 | 404 | 36 | 426 | Hot-Dip Galvannealing | 287 | 461 |
| 58 | 898 | 586 | 38 | 336 | | 272 | 387 |
| 59 | 881 | 330 | 23 | 197 | | 234 | 486 |
| 60 | 880 | 415 | 22 | 363 | | 242 | 409 |
| 61 | 866 | 547 | 20 | 447 | | 307 | 414 |
| 62 | 896 | 261 | 48 | 43 | | 305 | 436 |
| 63 | 898 | 116 | 45 | 346 | | 264 | 496 |
| 64 | Subsequent tests were stopped due to the cracked slab. | | | | | | |
| 65 | 887 | 513 | 14 | 118 | | 306 | 523 |
| 66 | 888 | 457 | 34 | 473 | Hot-Dip Galvannealing | 314 | 507 |
| 67 | 827 | 360 | 16 | 172 | | 292 | 463 |
| 68 | 899 | 3 | 24 | 506 | | 183 | 397 |
| 69 | 852 | 321 | 9 | 91 | | 244 | 471 |
| 70 | 899 | 567 | 43 | 7 | | 312 | 513 |

TABLE 4-1

| | Microstructure | | | | | |
|---|---|---|---|---|---|---|
| | | | Remainder | | Proportion of | |
| No. | Volume Percentage of Martensite (%) | Volume Percentage of Residual Austenite (%) | Volume Percentage of Ferrite (%) | Volume Percentage of Others Other Than Ferrite (%) | Measurement Points at Which Mn Segregation Degree is 1.1 or Greater (%) | Maximum Grain Diameter of Residual Austenite (μm) |
| 1 | 90 | 10 | 0 | 0 | 7.8 | 3.5 |
| 2 | 87 | 11 | 1 | 1 | 6.6 | 4.7 |
| 3 | 85 | 11 | 2 | 2 | 8.0 | 3.4 |
| 4 | 86 | 13 | 0 | 1 | 5.6 | 3.9 |
| 5 | 86 | 12 | 0 | 2 | 7.1 | 4.6 |
| 6 | 85 | 11 | 2 | 2 | 7.6 | 4.6 |
| 7 | 89 | 11 | 0 | 0 | 5.9 | 3.7 |
| 8 | 86 | 11 | 3 | 0 | 7.0 | 3.2 |
| 9 | 87 | 11 | 1 | 1 | 7.4 | 3.8 |
| 10 | 87 | 10 | 2 | 1 | 6.2 | 4.9 |
| 11 | 86 | 11 | 1 | 2 | 2.8 | 4.4 |
| 12 | 88 | 10 | 2 | 0 | 7.1 | 3.9 |
| 13 | 83 | 14 | 1 | 2 | 6.1 | 4.0 |
| 14 | 86 | 11 | 1 | 2 | 7.9 | 4.8 |
| 15 | 87 | 10 | 1 | 2 | 3.4 | 4.6 |
| 16 | 90 | 10 | 0 | 0 | 7.4 | 3.1 |
| 17 | 85 | 12 | 1 | 2 | 6.3 | 4.9 |
| 18 | 86 | 13 | 0 | 1 | 5.9 | 3.6 |
| 19 | 87 | 10 | 1 | 2 | 7.2 | 3.6 |
| 20 | 87 | 13 | 0 | 0 | 6.2 | 3.5 |
| 21 | 88 | 11 | 1 | 0 | 7.3 | 3.7 |

TABLE 4-1-continued

| | | Microstructure | | | | |
| | | | Remainder | | Proportion of | |
| No. | Volume Percentage of Martensite (%) | Volume Percentage of Residual Austenite (%) | Volume Percentage of Ferrite (%) | Volume Percentage of Others Other Than Ferrite (%) | Measurement Points at Which Mn Segregation Degree is 1.1 or Greater (%) | Maximum Grain Diameter of Residual Austenite (μm) |
| --- | --- | --- | --- | --- | --- | --- |
| 22 | 89 | 10 | 1 | 0 | 8.0 | 3.5 |
| 23 | 87 | 11 | 1 | 1 | 7.6 | 4.5 |
| 24 | 85 | 12 | 1 | 2 | 5.2 | 4.0 |
| 25 | 86 | 11 | 1 | 2 | 4.6 | 4.4 |
| 26 | 89 | 11 | 0 | 0 | 7.5 | 4.3 |
| 27 | 83 | 13 | 2 | 2 | 7.2 | 3.8 |
| 28 | 88 | 11 | 0 | 1 | 6.5 | 4.1 |
| 29 | 85 | 12 | 1 | 2 | 6.1 | 3.9 |
| 30 | 87 | 10 | 1 | 2 | 7.7 | 3.7 |
| 31 | 86 | 12 | 1 | 1 | 7.4 | 3.5 |
| 32 | 90 | 10 | 0 | 0 | 3.0 | 4.2 |
| 33 | 85 | 14 | 0 | 1 | 4.5 | 4.4 |
| 34 | 86 | 10 | 2 | 2 | 6.5 | 3.2 |
| 35 | 82 | 14 | 2 | 2 | 5.9 | 3.7 |

TABLE 4-2

| | | Microstructure | | | | |
| | | | Remainder | | Proportion of | |
| No. | Volume Percentage of Martensite (%) | Volume Percentage of Residual Austenite (%) | Volume Percentage of Ferrite (%) | Volume Percentage of Others Other Than Ferrite (%) | Measurement Points at Which Mn Segregation Degree is 1.1 or Greater (%) | Maximum Grain Diameter of Residual Austenite (μm) |
| --- | --- | --- | --- | --- | --- | --- |
| 36 | 88 | 10 | 0 | 2 | 6.1 | 3.7 |
| 37 | 88 | 10 | 1 | 1 | 7.3 | 3.2 |
| 38 | 88 | 11 | 0 | 1 | 2.9 | 4.9 |
| 39 | 89 | 10 | 0 | 1 | 6.5 | 3.9 |
| 40 | 84 | 15 | 0 | 1 | 2.0 | 4.6 |
| 41 | 88 | 10 | 1 | 1 | 8.0 | 4.8 |
| 42 | 87 | 12 | 0 | 1 | 5.7 | 4.1 |
| 43 | 89 | 10 | 0 | 1 | 6.7 | 4.4 |
| 44 | 87 | 12 | 0 | 1 | 6.1 | 3.9 |
| 45 | 85 | 12 | 2 | 1 | 1.4 | 4.7 |
| 46 | 89 | 10 | 0 | 1 | 7.3 | 4.9 |
| 47 | 89 | 11 | 0 | 0 | 7.4 | 4.5 |
| 48 | 89 | 11 | 0 | 0 | 3.3 | 4.5 |
| 49 | 84 | 11 | 3 | 2 | 7.2 | 4.7 |
| 50 | 87 | 12 | 0 | 1 | 7.2 | 4.1 |
| 51 | 87 | 10 | 2 | 1 | 4.4 | 4.3 |
| 52 | 83 | 15 | 2 | 0 | 6.0 | 3.6 |
| 53 | 86 | 11 | 2 | 1 | 4.6 | 4.0 |
| 54 | 86 | 12 | 0 | 2 | 5.8 | 4.2 |
| 55 | 89 | 10 | 0 | 1 | 4.3 | 4.9 |
| 56 | 87 | 11 | 0 | 2 | 7.3 | 3.3 |
| 57 | 90 | 4 | 1 | 5 | 5.8 | 4.6 |
| 58 | 89 | 10 | 0 | 1 | 5.5 | 4.2 |
| 59 | 59 | 10 | 10 | 21 | 6.4 | 3.8 |
| 60 | 86 | 11 | 2 | 1 | 7.8 | 3.1 |
| 61 | 83 | 15 | 1 | 1 | 13.6 | 5.3 |
| 62 | 87 | 10 | 1 | 2 | 11.4 | 5.4 |
| 63 | 84 | 12 | 2 | 2 | 12.4 | 6.0 |
| 64 | Subsequent tests were stopped due to the cracked slab. | | | | | |
| 65 | 84 | 13 | 1 | 2 | 11.8 | 6.8 |
| 66 | 85 | 12 | 3 | 0 | 10.4 | 5.9 |
| 67 | 59 | 13 | 28 | 0 | 5.8 | 4.2 |
| 68 | 66 | 11 | 21 | 2 | 4.9 | 4.4 |
| 69 | 66 | 10 | 12 | 12 | 3.1 | 4.6 |
| 70 | 91 | 6 | 1 | 2 | 6.1 | 4.0 |

TABLE 5-1

| | Mechanical Properties | | | | |
|---|---|---|---|---|---|
| No. | Tensile Strength (MPa) | Total Elongation (%) | Tensile Strength × Total Elongation (MPa · %) | Welded Joint Strength (kN) | Remarks |
| 1 | 1658 | 11.8 | 19564 | 6.3 | Invention Example |
| 2 | 1503 | 12.5 | 18788 | 6.4 | Invention Example |
| 3 | 1518 | 12.3 | 18671 | 6.5 | Invention Example |
| 4 | 1712 | 11.4 | 19517 | 6.1 | Invention Example |
| 5 | 1482 | 13.2 | 19562 | 6.1 | Invention Example |
| 6 | 2058 | 9.0 | 18522 | 6.3 | Invention Example |
| 7 | 1997 | 9.1 | 18173 | 6.2 | Invention Example |
| 8 | 1949 | 9.3 | 18126 | 6.1 | Invention Example |
| 9 | 1828 | 10.8 | 19742 | 6.3 | Invention Example |
| 10 | 1581 | 11.6 | 18340 | 6.4 | Invention Example |
| 11 | 1471 | 12.8 | 18829 | 6.6 | Invention Example |
| 12 | 1660 | 11.9 | 19754 | 6.1 | Invention Example |
| 13 | 1560 | 12.3 | 19188 | 6.1 | Invention Example |
| 14 | 1776 | 10.3 | 18293 | 6.1 | Invention Example |
| 15 | 1842 | 9.9 | 18236 | 6.6 | Invention Example |
| 16 | 1600 | 11.3 | 18080 | 6.2 | Invention Example |
| 17 | 1726 | 10.6 | 18296 | 6.6 | Invention Example |
| 18 | 1945 | 9.9 | 19256 | 6.1 | Invention Example |
| 19 | 2098 | 8.7 | 18253 | 6.5 | Invention Example |
| 20 | 1542 | 11.8 | 18196 | 6.3 | Invention Example |
| 21 | 1682 | 11.2 | 18838 | 6.2 | Invention Example |
| 22 | 1478 | 12.5 | 18475 | 6.1 | Invention Example |
| 23 | 1580 | 11.7 | 18486 | 6.3 | Invention Example |
| 24 | 1707 | 10.6 | 18094 | 6.3 | Invention Example |
| 25 | 1485 | 13.2 | 19602 | 6.4 | Invention Example |
| 26 | 2136 | 8.9 | 19010 | 6.2 | Invention Example |
| 27 | 1938 | 10.5 | 20349 | 6.5 | Invention Example |
| 28 | 1866 | 9.8 | 18287 | 6.3 | Invention Example |
| 29 | 1855 | 9.9 | 18365 | 6.1 | Invention Example |
| 30 | 1608 | 11.7 | 18814 | 6.3 | Invention Example |
| 31 | 1486 | 13.6 | 20210 | 6.1 | Invention Example |
| 32 | 1653 | 11.2 | 18514 | 6.1 | Invention Example |
| 33 | 1497 | 13.3 | 19910 | 6.2 | Invention Example |
| 34 | 1803 | 10.1 | 18210 | 6.4 | Invention Example |
| 35 | 1875 | 9.9 | 18563 | 6.5 | Invention Example |

TABLE 5-2

| | Mechanical Properties | | | | |
|---|---|---|---|---|---|
| No. | Tensile Strength (MPa) | Total Elongation (%) | Tensile Strength × Total Elongation (MPa · %) | Welded Joint Strength (kN) | Remarks |
| 36 | 1557 | 11.9 | 18528 | 6.4 | Invention Example |
| 37 | 1795 | 10.6 | 19027 | 6.2 | Invention Example |
| 38 | 2080 | 8.8 | 18304 | 6.3 | Invention Example |
| 39 | 2083 | 9.1 | 18955 | 6.3 | Invention Example |
| 40 | 1500 | 12.2 | 18300 | 6.3 | Invention Example |
| 41 | 1741 | 10.5 | 18281 | 6.4 | Invention Example |
| 42 | 1572 | 12.4 | 19493 | 6.1 | Invention Example |
| 43 | 1533 | 11.9 | 18243 | 6.2 | Invention Example |
| 44 | 1776 | 10.5 | 18648 | 6.1 | Invention Example |
| 45 | 1495 | 12.8 | 19136 | 6.2 | Invention Example |
| 46 | 2043 | 9.0 | 18387 | 6.4 | Invention Example |
| 47 | 1990 | 10.2 | 20298 | 6.3 | Invention Example |
| 48 | 1820 | 10.0 | 18200 | 6.3 | Invention Example |
| 49 | 1840 | 10.6 | 19504 | 6.4 | Invention Example |
| 50 | 1594 | 11.6 | 18490 | 6.2 | Invention Example |
| 51 | 1534 | 11.9 | 18255 | 6.2. | Invention Example |
| 52 | 1781 | 11.1 | 19769 | 6.3 | Invention Example |
| 53 | 1558 | 11.7 | 18229 | 6.4 | Invention Example |
| 54 | 1768 | 10.4 | 18387 | 6.2 | Invention Example |
| 55 | 1379 | 13.4 | 18479 | 6.5 | Comparative Example |
| 56 | 2017 | 6.2 | 12505 | 6.2 | Comparative Example |
| 57 | 1652 | 6.0 | 9912 | 6.6 | Comparative Example |
| 58 | 1596 | 12.4 | 19790 | 5.1 | Comparative Example |
| 59 | 1241 | 9.8 | 12162 | 6.6 | Comparative Example |
| 60 | 1806 | 10.1 | 18241 | 5.2 | Comparative Example |
| 61 | 1479 | 13.2 | 19523 | 5.4 | Comparative Example |
| 62 | 1489 | 12.2 | 18166 | 5.8 | Comparative Example |
| 63 | 1833 | 9.9 | 18147 | 5.7 | Comparative Example |
| 64 | | Subsequent tests were stopped due to the cracked slab. | | | Comparative Example |
| 65 | 1675 | 11.0 | 18425 | 5.2 | Comparative Example |
| 66 | 1544 | 12.3 | 18991 | 5.5 | Comparative Example |
| 67 | 1101 | 19.6 | 21580 | 6.2 | Comparative Example |
| 68 | 1388 | 13.4 | 18599 | 6.6 | Comparative Example |
| 69 | 1407 | 13.1 | 18432 | 6.2 | Comparative Example |
| 70 | 1772 | 8.0 | 14176 | 6.6 | Comparative Example |

As can be seen from Tables 1-1 to 5-2, all of the invention examples are steel sheets having excellent formability and a tensile strength of 1,470 MPa or greater, and a sufficient welded joint strength is obtained.

On the other hand, in the comparative examples in which at least one of the chemical composition, the volume percentage of each phase of the microstructure, the maximum grain diameter of residual austenite, or the proportion of measurement points at which the segregation degree was 1.1 or greater did not satisfy the scope of the present invention, one or more of tensile strength, formability, and welded joint strength did not satisfy the target value.

BRIEF DESCRIPTION OF THE REFERENCE SYMBOLS

A: region for structure observation (region of 100 μm×100 μm within range of t/8 to 3t/8 centered at t/4-position)
B: region for measuring Mn concentration (square region with side length of t/4 centered at t/4-position)
t: sheet thickness

INDUSTRIAL APPLICABILITY

According to the present invention, it is possible to provide a steel sheet which has excellent formability and a tensile strength of 1,470 MPa or greater and can obtain a sufficient welded joint strength. Therefore, the present invention has high industrial applicability.

What is claimed is:

1. A steel sheet comprising, as a chemical composition, by mass %:
C: 0.20% to 0.45%;
Si: 0.50% to 2.50%;
Mn: 1.50% to 3.50%;
Al: 0.005% to 1.500%;
P: 0% to 0.040%;
S: 0% to 0.010%;
N: 0% to 0.0100%;
O: 0% to 0.0060%;
Cr: 0% to 0.50%;
Ni: 0% to 1.00%;
Cu: 0% to 1.00%;
Mo: 0% to 0.50%;
Ti: 0% to 0.200%;
Nb: 0% to 0.200%;
V: 0% to 0.500%;
B: 0% to 0.0100%;
W: 0% to 0.1000%;
Ta: 0% to 0.1000%;
Sn: 0% to 0.0500%;
Co: 0% to 0.5000%;
Sb: 0% to 0.0500%;
As: 0% to 0.0500%;
Mg: 0% to 0.0500%;
Ca: 0% to 0.0400%;
Y: 0% to 0.0500%;
La: 0% to 0.0500%;
Ce: 0% to 0.0500%;
Zr: 0% to 0.0500%; and
a remainder: Fe and impurities,
wherein when a sheet thickness is denoted by t, a metallographic structure at a t/4-position, which is a position t/4 away from a surface, in a cross section in a sheet thickness direction includes, by volume percentage,
martensite: 70% or greater, and
residual austenite: 10% or greater,
a maximum grain diameter of the residual austenite is less than 5.0 μm,
when a Mn concentration is measured at a plurality of measurement points at intervals of 1 μm in a square region with a side length of t/4 centered at the t/4-position in the cross section in the sheet thickness direction, a proportion of measurement points at which the Mn concentration is 1.1 times or greater than an average of the Mn concentrations at all of the plurality of measurement points is less than 10.0%, and
a tensile strength is 1,470 MPa or greater.

2. The steel sheet according to claim 1,
wherein the chemical composition contains, by mass %, one or more of:
Cr: 0.01% to 0.50%;
Ni: 0.01% to 1.00%;
Cu: 0.01% to 1.00%;
Mo: 0.01% to 0.50%;
Ti: 0.001% to 0.200%;
Nb: 0.001% to 0.200%;
V: 0.001% to 0.500%;
B: 0.0001% to 0.0100%;
W: 0.0005% to 0.1000%;
Ta: 0.0005% to 0.1000%;
Sn: 0.0010% to 0.0500%;
Co: 0.0010% to 0.5000%;
Sb: 0.0010% to 0.0500%;
As: 0.0010% to 0.0500%;
Mg: 0.0001% to 0.0500%;
Ca: 0.0001% to 0.0400%;
Y: 0.0001% to 0.0500%;
La: 0.0001% to 0.0500%;
Ce: 0.0001% to 0.0500%; and
Zr: 0.0001% to 0.0500%.

3. The steel sheet according to claim 1,
wherein the steel sheet has a hot-dip galvanized layer on the surface.

4. The steel sheet according to claim 3,
wherein the hot-dip galvanized layer is a hot-dip galvannealed layer.

* * * * *